(12) United States Patent
Clarke et al.

(10) Patent No.: US 7,237,034 B2
(45) Date of Patent: Jun. 26, 2007

(54) METHOD AND APPARATUS FOR CONTROLLING NETWORK TRAFFIC

(75) Inventors: James Clarke, Banbridge (GB); Michael E. S. Luna, Dublin, CA (US); Nicholas Wood, Belfast (GB)

(73) Assignee: Openwave Systems Inc., Redwood City, CA (US)

( * ) Notice: Subject to any disclaimer, the term of this patent is extended or adjusted under 35 U.S.C. 154(b) by 806 days.

(21) Appl. No.: 09/920,426

(22) Filed: Jul. 31, 2001

(65) Prior Publication Data

US 2002/0035642 A1    Mar. 21, 2002

Related U.S. Application Data

(60) Provisional application No. 60/233,164, filed on Sep. 18, 2000.

(51) Int. Cl.
  *G06F 15/16*   (2006.01)
  *G06F 11/00*   (2006.01)
(52) U.S. Cl. ...................... 709/235; 370/230
(58) Field of Classification Search ........ 370/229–235, 370/310, 447–448; 709/203, 235
See application file for complete search history.

(56) References Cited

U.S. PATENT DOCUMENTS

| | | | | |
|---|---|---|---|---|
| 5,689,502 A | * | 11/1997 | Scott ........................... | 370/281 |
| 6,041,038 A | | 3/2000 | Aimoto | |
| 6,256,301 B1 | * | 7/2001 | Tiedemann et al. ......... | 370/342 |
| 6,370,123 B1 | * | 4/2002 | Woo ............................. | 370/278 |
| 6,388,997 B1 | * | 5/2002 | Scott ........................... | 370/280 |
| 6,446,108 B1 | * | 9/2002 | Rosenberg et al. ......... | 709/203 |
| 6,650,619 B1 | * | 11/2003 | Schuster et al. ............. | 370/230 |
| 6,661,773 B1 | * | 12/2003 | Pelissier et al. ............. | 370/228 |
| 6,721,281 B1 | * | 4/2004 | Dick et al. ................... | 370/252 |
| 6,788,937 B1 | * | 9/2004 | Willenegger et al. ....... | 455/434 |

(Continued)

FOREIGN PATENT DOCUMENTS

| | | |
|---|---|---|
| EP | 0838924 A1 | 4/1998 |
| WO | WO94/14263 A1 | 6/1994 |
| WO | WO00/22764 A1 | 4/2000 |

OTHER PUBLICATIONS

Newton's Telecom Dictionary, 18th Ed., Harry Newton, CMP Books, 2002, p. 358.*

(Continued)

*Primary Examiner*—David Wiley
*Assistant Examiner*—George C. Neurauter, Jr.
(74) *Attorney, Agent, or Firm*—Blakely Sokoloff Taylor & Zafman LLP (57) ABSTRACT

An intermediary node on a data communications network implements a flow control algorithm to control network congestion. The intermediary node receives messages destined for servers or other upstream nodes from clients or other downstream nodes and determines whether to forward the messages based on the flow control algorithm, which may be adaptive. The algorithm may consider explicit back-off messages received from upstream nodes, failure of upstream nodes to respond to messages forwarded by the intermediary node, and/or other criteria. When a back-off condition applies, the intermediary node refrains from forwarding messages it receives and sends back-off messages to nodes initiating the messages. Back-off messages may include a back-of time period and/or other back-off criteria.

25 Claims, 8 Drawing Sheets

U.S. PATENT DOCUMENTS

| | | |
|---|---|---|
| 6,791,944 B1* | 9/2004 | Demetrescu et al. ........ 370/235 |
| 6,987,982 B2* | 1/2006 | Willenegger et al. ....... 455/515 |
| 2004/0019658 A1* | 1/2004 | Plastina et al. ............. 709/217 |
| 2006/0007862 A1* | 1/2006 | Sayeedi et al. ............. 370/235 |

OTHER PUBLICATIONS

Newton's Telecom Dictionary, 16th Ed., Harry Newton, Telecom Books/CMP Media, Inc., Feb. 2000, p. 906.*

IP Telephony: Packet-based Multimedia Communications Systems, Hersent, Olivier, et al., Addison Wesley Professional, Dec. 1999, p. 6.*

Harry Newton, *Newton's Telecom Dictionary*, The Official Dictionary of Telecommunications Networking and the Internet, 16th Expanded & Updated Edition, Published by Telecom Books, New York, NY, 2000, pp. 448, 829, 830-832, 834-835.

* cited by examiner

METHOD AND APPARATUS FOR CONTROLLING NETWORK TRAFFIC

This application claims the benefit of Provisional U.S. Patent application No. 60/233,164, filed on Sep. 18, 2000, and entitled, "Proxy Based Preventative Flow Control".

FIELD OF THE INVENTION

The present invention pertains to controlling traffic on a data communication network. More particularly, the present invention relates to a proxy based technique for controlling traffic on a client-server network.

BACKGROUND OF THE INVENTION

In a large scale data communications network with millions of users, controlling the load on origin servers and network infrastructure is crucial. As the number of clients in a network increases, a server will receive an increasing number of requests to process. The number of requests may exceed the capacity of the server or of network infrastructure such as switches, gateways, and proxies, particularly during peak traffic or a maintenance period. Consequently, there is a need for a mechanism to gracefully reduce the number of incoming requests to a network server.

A basic solution currently employed is to increase the capacity of servers or infrastructure before an overload situation occurs. However, this approach is impractical in most cases, as it is usually hard to accurately estimate the growth of the number of clients or to predict peak levels. Further, this approach may be prohibitively expensive, as it requires design for the maximum possible traffic, which may be substantially greater than the normal traffic.

A better solution is to employ some form of flow control mechanism. In current technology, such mechanisms are defined between an origin server and individual clients, i.e., end-to-end. For example, an origin server may refuse a connection to a particular client, or it may return an incoming request to the issuing client, asking it to wait for a certain time before issuing any more requests. Similarly, infrastructure such as proxies may refuse connections or use connection end-to-end flow control. An example of current technology is the hypertext transport protocol (HTTP) flow control mechanism, allowing origin servers to return an error response to a client, indicating that the service is temporarily unavailable and that requests should be suspended for a certain period of time. Another example is the flow control mechanism provided by transport control protocol (TCP), which allows flow control end-to-end on individual TCP connections. This type of solution is better than relying on capacity planning alone, but it can only be used once a client has actually made a request. It is not possible with these schemes to take preventative measures, holding off requests from other clients before they have actually reached the origin server or some congested infrastructure element. In a large network with millions of users, this can be a serious problem.

SUMMARY OF THE INVENTION

The present invention includes a method and apparatus for using an intermediary node on a network to forward messages on behalf of a plurality of other nodes on the network. The intermediary node is used to determine when a message received by the intermediary node and destined for one of the other nodes should not be forwarded, based on detected congestion on the network.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for using an intermediary node on a data communication network to control network congestion are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

As described in greater detail below, an intermediary node on a data communications network, such as a proxy, may implement a flow control algorithm to control network congestion. The intermediary node receives messages destined for servers or other upstream nodes from clients or other downstream nodes and determines whether to forward the messages based on the flow control algorithm, which may be adaptive based on network performance and/or usage. The algorithm may consider explicit back-off messages received from upstream nodes, failure of upstream nodes to respond to messages it forwarded, and/or other criteria. When a back-off condition applies, the intermediary node refrains from forwarding messages it receives and sends back-off messages to nodes initiating the messages. Back-off messages may include a back-off time period and/or other back-off criteria.

To facilitate description, the flow control technique is described herein as being implemented within a network proxy. Note, however, that in other embodiments the technique may be implemented within other types of intermediary network nodes, such as switches, routers, gateways, and other similar devices.

The flow control technique described herein is based on the observation that in a large scale network, traffic between a client and an origin server passes through a number of intermediary nodes in the network, such as network proxies, local switches, and gateways. When a back-off response is returned by an origin server in response to a request from a client, the response may be intercepted by an intermediary node downstream from the server. This fact allows the intermediary node to learn that a particular origin server is overloaded. Similarly, a congested intermediary node may send back-off requests to other downstream intermediary nodes to hold off new requests. When another request is passed via the same downstream intermediary node, the intermediary node may return a back-off response immediately to the client, since it already knows that there is an overload situation. Thus, the number of requests that actually reach the congested entity once an overload situation has occurred is greatly reduced. In addition, the communications traffic between clients and the intermediary node is also reduced. Once the back-off period has expired, the downstream intermediary node returns to forwarding the requests as usual.

Figure 1:
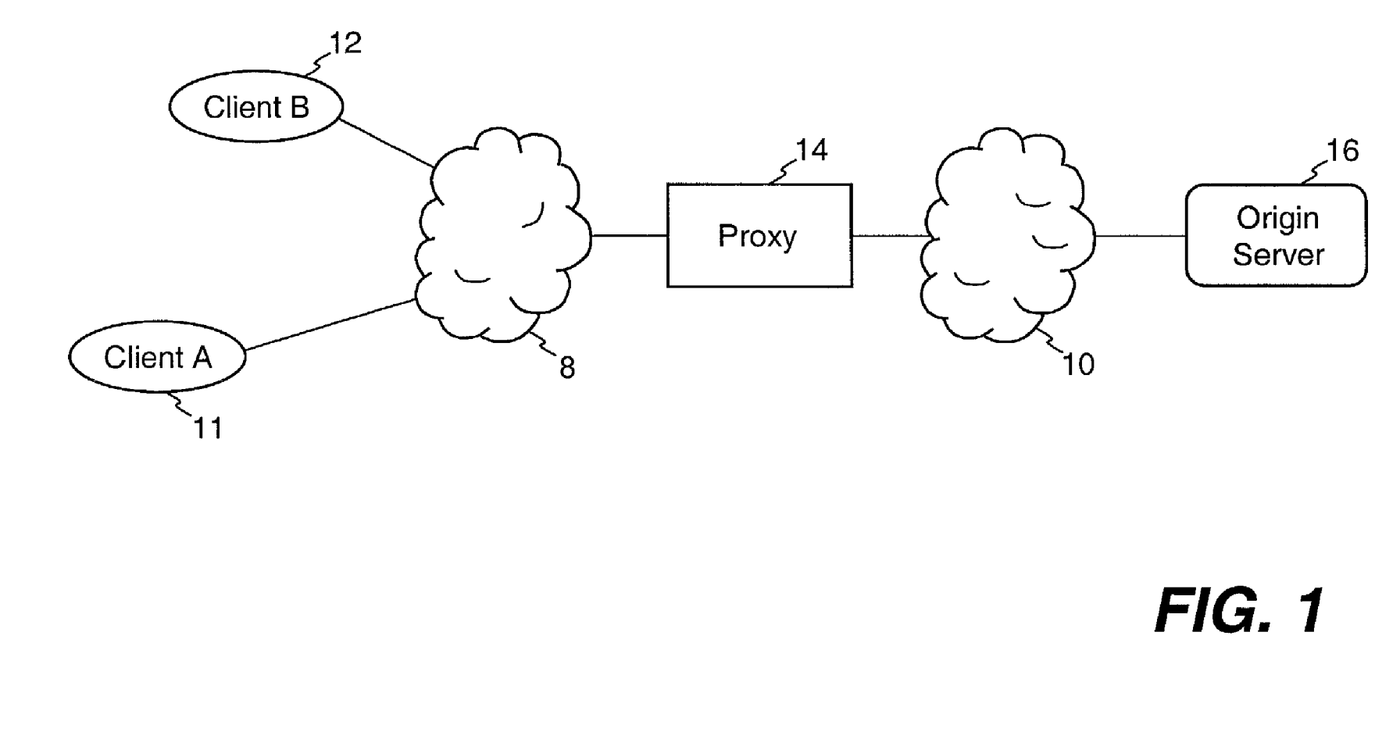
FIG. 1 illustrates a network which includes a proxy, an origin server, and multiple clients.

Refer now to FIG. 1, which illustrates an example of a network in which this flow control technique may be implemented. The network includes a number of nodes, including clients 11 and 12, a proxy 14, and an origin server 16. Various other network nodes which are not shown may also be present in the network between the aforementioned nodes or elsewhere in the network. Clients 11 and 12 are connected to proxy 14 via a subnetwork 8. Proxy 14 is connected to the origin server 16 via a subnetwork 10. Subnetworks 8 and 10 can be the same subnetwork, different but overlapping subnetworks, or completely separate subnetworks.

It is assumed that the Internet paradigm is embodied in the illustrated network. Note that the illustrated network might include various different types of networks and subnetworks, including one or more wireless telecommunications networks and/or one or more landline networks, such as the Internet. In one embodiment, subnetwork 8 is a wireless telecommunications network and subnetwork 10 is a landline network such as the Internet. Thus, in various embodiments either or both of clients 11 and 12 might be a mobile device equipped to operate on a wireless network, such as a cellular telephone, personal digital assistant (PDA), notebook computer, etc. Origin server 16 may be a conventional World Wide Web server on the Internet, for example.

The proxy 14 typically performs content caching, acts as a firewall etc. This proxy topology is common for large networks on the Internet. In various embodiments, the proxy 14 may be exchanged for, combined with, included in, or it may include, a telephony switch, a gateway (e.g., one which converts messages between wireless access protocol (WAP) used on a wireless subnetwork 8 and HTTP used on a landline subnetwork 10), or other device.

Figure 2:
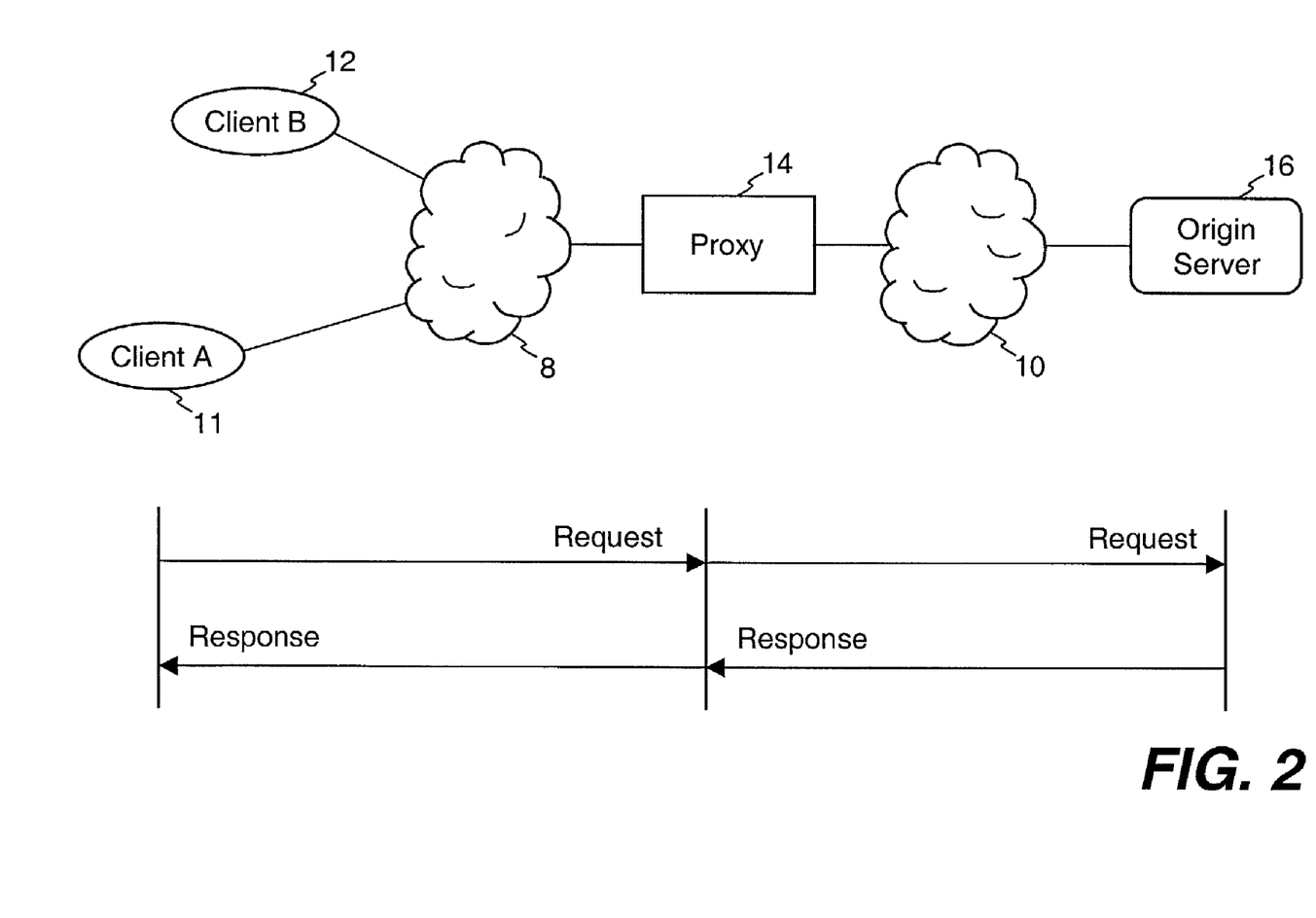
FIG. 2 illustrates a conventional sequence of messages communicated in the network of FIG. 1.

FIG. 2 illustrates a normal sequence of messages which may be communicated in the network of FIG. 1. When a client 11 or 12 makes a request to the origin server 16, the request is passed via the proxy 14. A response is passed back to the requesting client, again via the proxy 14.

Figure 3:
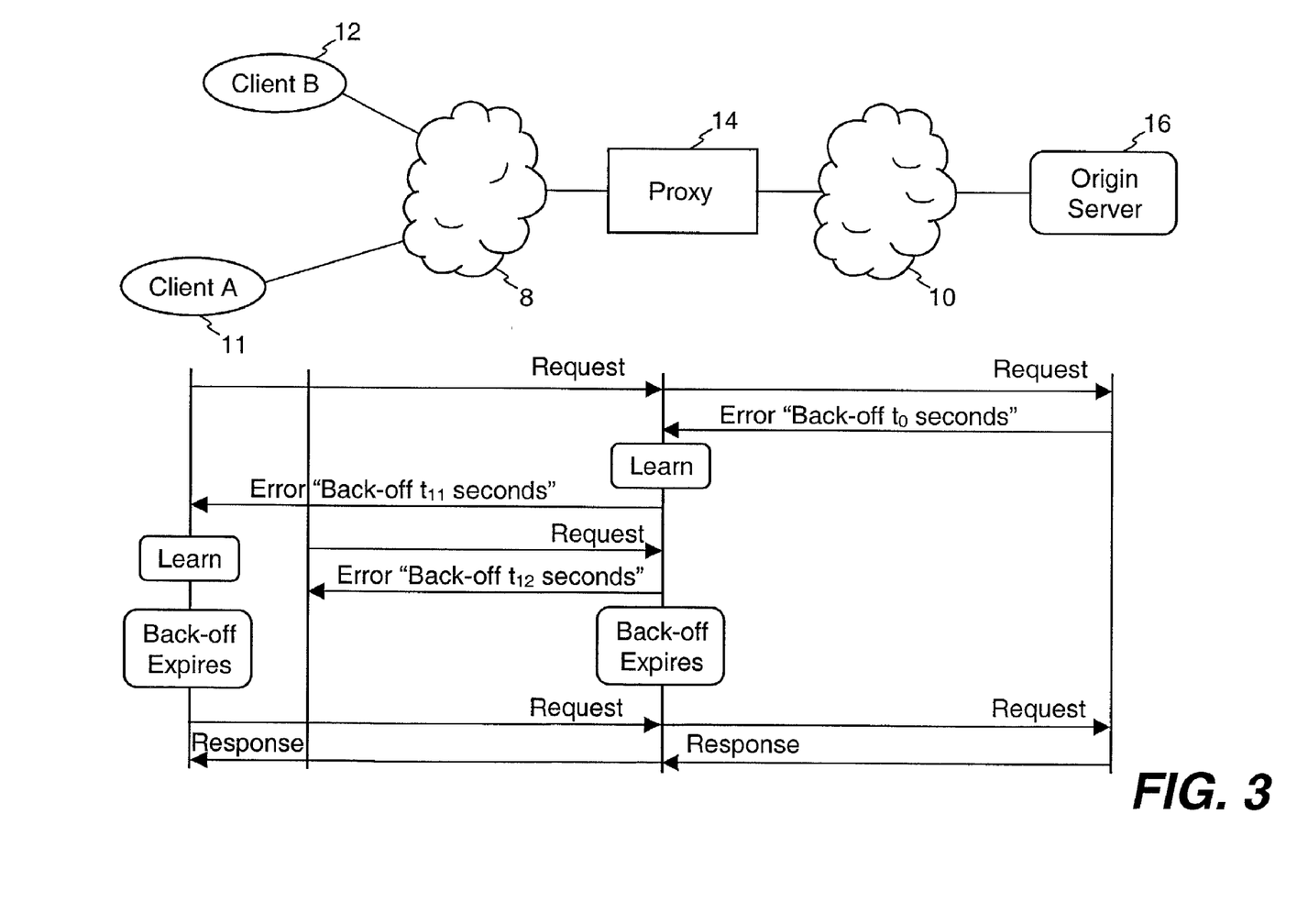
FIG. 3 shows a sequence of messages communicated in the network of FIG. 1 according to an embodiment of the present invention.

Refer now to FIG. 3, which shows a simple example of a sequence of messages that may be communicated in the network of FIG. 1, according to one embodiment of the present invention. The origin server 16 receives a request from client 11 that it is temporarily unable to handle, and in response, returns an error response to client 11 indicating a back-off period $t_o$. This response is passed back via the proxy 14, which recognizes this response type and learns the back-off time for the origin server 16 before forwarding the response to client 11. Thus, the proxy 14 forwards a back-off message to client 11 indicating a back-off period $t_{11}$, which in this example is assumed to be equal to $t_o$. At this point, client 12 issues a request to the origin server 16. Again the request is passed via the proxy 14, but in this case the proxy 14 already knows that the origin server 16 is experiencing an overload situation (the back-off timer has not yet expired). Consequently, the proxy 14 returns a back-off response to the client 12, indicating a back-off period $t_{12}$ (which in this example is assumed to be equal to $t_o$), thus reducing the number of requests actually reaching the congested origin server 16. Note that this also has the benefit of reducing the number of requests sent from clients to the proxy 14, assuming the clients comply at least somewhat with the back-off messages. At a later time, after the back-off timer at client 11 has expired, client 11 issues a new request to the origin server 16. At this point, the back-off timer in the proxy 14 has also expired, and so the request is passed through again as in the normal case.

As noted, the foregoing is a simple example. Various different flow control (back-off) algorithms may be employed by a network proxy or other intermediary node. For example, the back-off time $t_{12}$ returned to client 12 may be the same as the back-off time $t_{11}$ returned to client 11, which in turn may be the same as the back-off time $t_o$ returned from the origin server and the back-off time $t_p$ used by the proxy. This means that any new requests once these timers have expired will be spaced out in time, avoiding a sudden surge of requests, while it is ensured that $t_o$ is honored. However, most clients will back-off for a longer time than is strictly necessary. As another example, the back-off times may be different, e.g. $t_{11}$ and $t_{12}$ may be less than $t_o$, or $t_p$ may be less than $t_o$, resulting in a less conservative retry mechanism.

The flow control algorithm of the proxy may also implement different back-off strategies for different users or groups of users, for different origin servers (e.g., based on uniform resource identifier (URI)) and/or for different points in time. For example, a back-off strategy may be applied more conservatively to certain origin servers than to others. A back-off strategy from the proxy may be targeted only at a specific user or a group of users. Furthermore, the flow control algorithm of the proxy may be adaptive, learning over time which origin servers are most prone to overload or which clients are most intense in their utilization of particular origin servers. It may select different back-off strategies based on this acquired knowledge. Thus, after accumulating a number of responses, or failure or delay to respond by one or more origin servers, a proxy may decide to initiate a back-off condition, for a time period the proxy determines on its own, independently of any back-off message received from an origin server. As yet another example, the back-off times returned by the proxy may be different depending on when the back-off response is returned. For example $t_{11}$ may be greater than $t_{12}$. Furthermore, a back-off strategy may be implemented by the proxy preventatively, using an algorithm which predicts a critical level of network congestion before it occurs.

Figure 4:
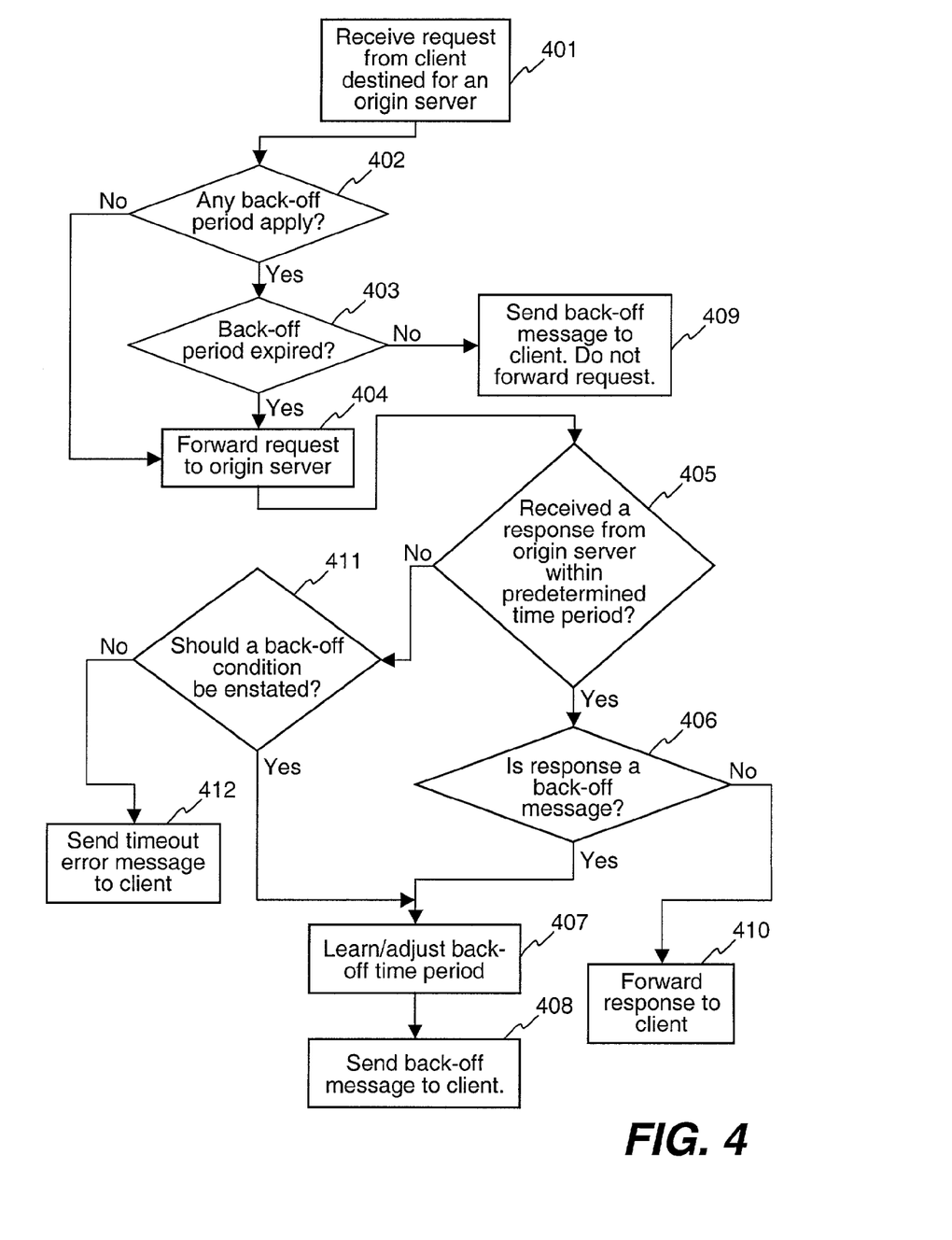
FIG. 4 is a flow diagram illustrating a flow control process which may be implemented in a proxy according to the present invention.

Refer now to FIG. 4, which shows an example of a flow control process that may be implemented in a proxy, such as proxy 14 in FIG. 1, according to one embodiment of the present invention. Initially, at processing block 401 the proxy receives a request destined for an origin server from a client. At block 402 the proxy determines whether there is any back-off period that applies to the request. As described above, a back-off period may be considered to apply to a request if the a back-off period has been defined for the requesting client, the target origin server, or another device or group of devices that the proxy determines will be affected by the request. If no back-off period applies, the process continues from block 404, described below.

If there is a back-off period that applies, then at block 403 the proxy determines whether the back-off period has expired. If the back-off period has expired, the proxy forwards the request to the target origin server at block 404. If the back-off period has not expired, the proxy 14 sends a back-off message to the requesting client at block 408, without forwarding the request. The back-off message may include one or more back-off criteria, such as a back-off time period indicating a minimum amount of time the client should wait before retrying the request.

If the request is forwarded to the origin server at block 404, the process continues with block 405, where the proxy determines whether a response has been received from the origin server within a predefined time period ("timeout" period). If a response was received from the server within the timeout period, the proxy determines at block 406 whether the response is a back-off message. A "back-off message" may be defined to be any response by the origin server that the proxy determines to warrant restricting or preventing clients' access to that origin server for a period of time. A back-off message may include one or more back-off criteria, such as a back-off time period indicating a minimum amount of time a device should wait before sending another request.

If the response is determined not to be a back-off message, the proxy simply forwards the response to the client at block 410. If the response is a back-off message, the proxy "learns" a back-off time period (or adjusts a previously learned back-off time period, if necessary) at block 407 and sends a back-off message to the client at block 408 the proxy. Learning a back-off time period may involve simply storing a back-off period specified by the response from the origin server, or it may involve the proxy's computing a back-off period or other back-off criteria based on a predetermined flow control algorithm. Such algorithm may take into account any of the factors mentioned above.

The proxy's sending the back-off message to the client at block 408 may consist of simply forwarding the back-off message it received from the server, or it may consist of sending a new back-off message to the client. In the latter case, the back-off message sent by the proxy to the client may or may not include the same back-off time period or other criteria from the back-off message received from the upstream device. That is, the proxy may make its own determination of the back-off criteria.

If it is determined at block 405 that a response was not received from the origin server within the timeout period, the process branches to block 411, where the proxy determines whether a back-off condition should be enstated. This determination may also be made based on a predetermined flow control algorithm, which may take into account any of the factors mentioned above (e.g., how many times this server has previously failed to respond within a predefined time period). If the proxy determines it is appropriate to enstate a back-off condition, the process proceeds from block 407 (described above), where the proxy learns the back-off time period. Otherwise, at block 412 the proxy simply sends a timeout error message to the client, indicating the server failed to respond.

The above-described technique is not limited to reducing the load on origin servers; it may also be used to reduce the load on intermediary network nodes (e.g., proxies, switches, and routers). To consider this application of the technique, refer to FIG. 5, which shows another network embodiment. The embodiment of FIG. 5 includes two clients 11 and 12, two proxies 14 and 18, and an origin server 16. As in the previous example, each proxy could be exchanged for another type of device, such as a gateway (e.g. a WAP gateway), a switch, etc. Further embodiments may include any number of intermediaries.

Figure 5:
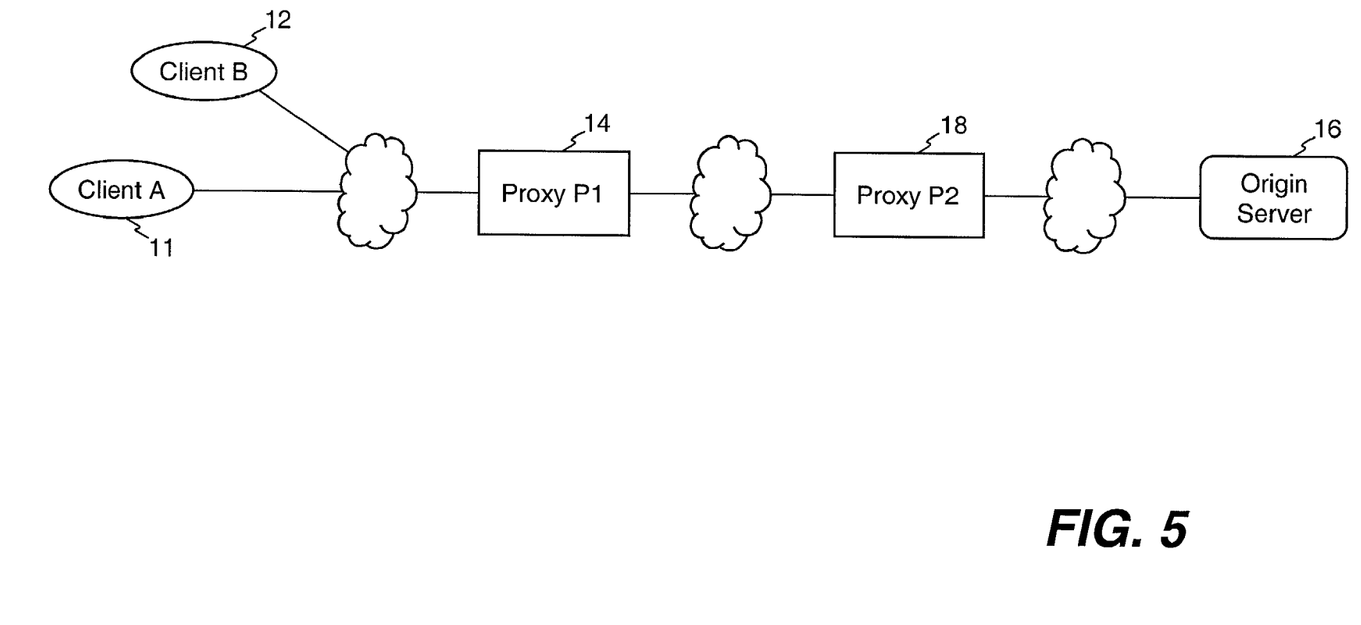
FIG. 5 illustrates a network which includes multiple proxies, an origin server, and multiple clients.
Figure 6:
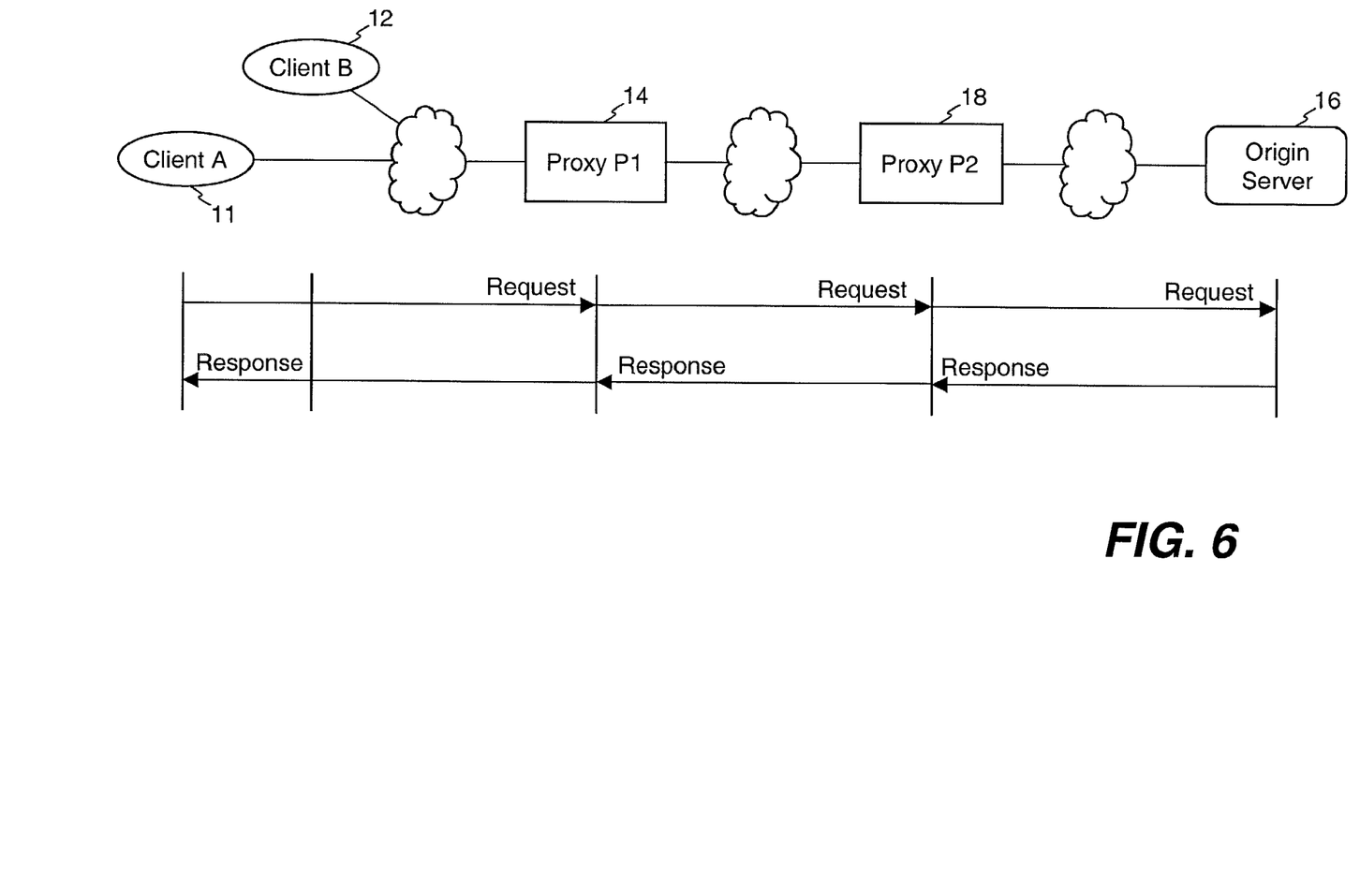
FIG. 6 shows a conventional sequence of messages communicated in the network of FIG. 5.

FIG. 6 shows an example of a normal sequence of messages that may be communicated in the network embodiment of FIG. 5. When client 11 or 12 makes a request to the origin server 16, the request is passed via the two proxies 14 and 18. A response is passed back to the client, again via both proxies 14 and 18.

Figure 7:
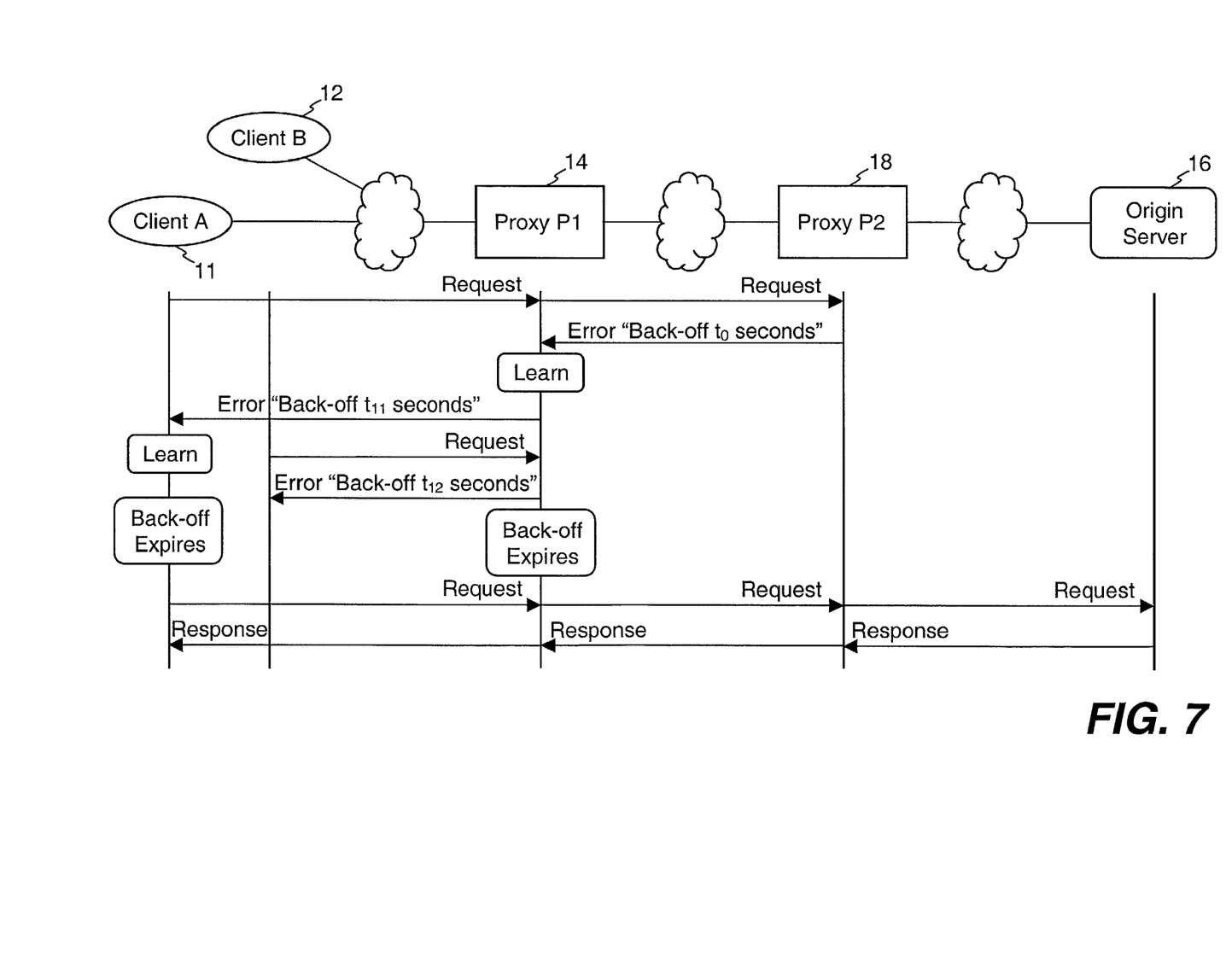
FIG. 7 shows a sequence of messages communicated in the network of FIG. 5 according to an embodiment of the present invention.

FIG. 7 shows a sequence of messages that may be communicated in the network of FIG. 5, according to an embodiment of the present invention. Client 11 initially issues a request to the origin server 16. If the upstream proxy 18 is temporarily unable to handle traffic to that origin server, such as due to proxy overload or upstream congestion (e.g. network congestion detected on the TCP level), it may return an error response to client 11 indicating a back-off period $t_o$. The downstream proxy 14 recognizes this response type and learns the back-off time as in the previous example. Thus, the downstream proxy 14 forwards a back-off message to client 11 indicating a back-off period $t_{11}$, which may be equal to $t_o$.

At this point, client 12 issues a request to the origin server 16. Again the request is passed via the downstream proxy 14, but in this case proxy 14 already knows that there is an upstream overload situation for this origin server (the back-off timer has not yet expired). Consequently, downstream proxy 14 returns a back-off response to client 12, indicating a back-off period $t_{12}$ (which may be equal to $t_o$), thus reducing the number of requests actually reaching the upstream proxy 18 and the origin server 16. Note that this also has the benefit of reducing the number of requests sent from clients, assuming the clients comply at least somewhat with the back-off messages. At a later time, after the back-off timer at client 11 has expired, client 11 issues a new request to the origin server 16. At this point, the back-off timer in the downstream proxy 14 has also expired, and so the request is passed through again as in the normal case.

Any one or more of the back-off strategies mentioned above may be employed in either or both of proxies 14 and 18. As in the previous example, the strategy or strategies (including, e.g., back-off times) may be different for different users or groups of users, for different origin servers or upstream proxies (e.g. based on URI and/or TCP connection), at different points in time, etc., as in the previous example. In addition, the back-off criteria in the back-off message returned by the upstream proxy 18 may include not only a back-off time, but also additional metadata. The metadata either indicates or can be used by the proxy to determine the scope (applicability) of the back-off message, for example, whether the back-off concerns only requests for a particular origin server or group of origin servers (e.g., an origin server overload as described in the previous example, or congestion on a TCP connection), or whether it concerns all requests passed via proxy 18 (proxy overload). This metadata may be used by the flow control algorithm in the downstream proxy 14, or even by clients 11 and 12, to select a suitable back-off strategy. The metadata may consist of, or it may be included in, an HTTP header or other type of header in the response.

Figure 8:
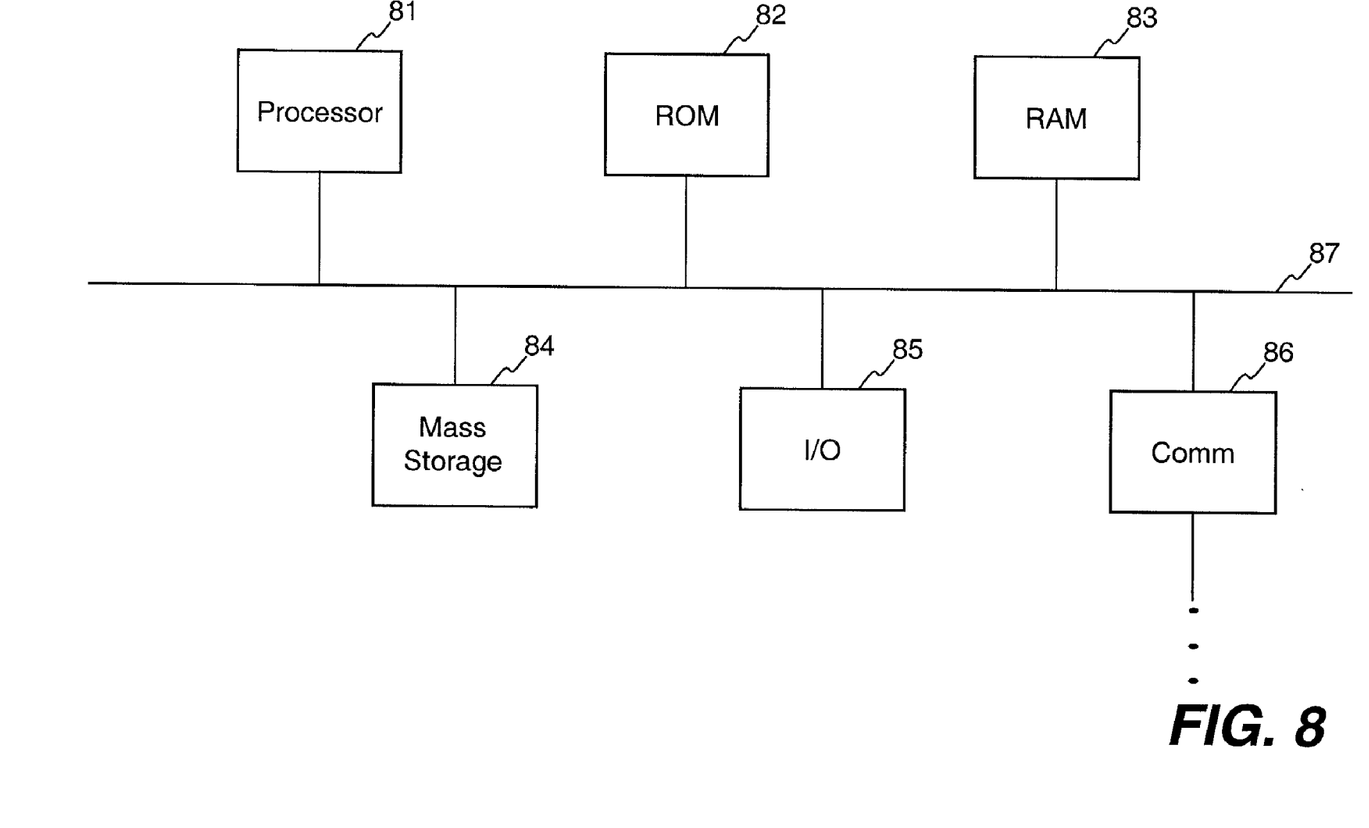
FIG. 8 is a high-level block diagram of a processing system which may be used to implement any of the processing systems in FIGS. 1 through 7.

FIG. 8 is a high-level block diagram showing an example of a processing system which may be used to implement any of the devices mentioned above, e.g., a proxy, a client, or an origin server. Note that FIG. 8 is a high-level conceptual representation, which is not intended to depict any one specific physical arrangement of components; such details are not germane to the present invention and are well within the knowledge of those skilled in the art. As shown, the processing system includes one or more processors 81, i.e. a central processing unit (CPU), read-only memory (ROM) 82, and random access memory (RAM) 83 each connected to a bus system 87. The processor(s) 81 may be, or may include, one or more programmable general-purpose or special-purpose microprocessors or digital signal processors (DSPs), application specific integrated circuits (ASICs), programmable logic devices (PLDs), or a combination of such devices. The bus system 87 includes one or more buses, which may be connected to each other through various bridges, controllers and/or adapters, such as are well-known in the art. For example, the bus system 87 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 87 are a mass storage device 84, (optionally) a number of I/O devices 85, and one or more data communication devices 86. Mass storage device 84 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices.

Each data communication device 86 is a device suitable for enabling the processing system to communicate with remote devices and may be, for example, a conventional modem, a Digital Subscriber Line (DSL) modem, a cable modem, an Ethernet adapter, an Integrated Services Digital Network (ISDN) adapter, a wireless transceiver (e.g., in the case of a mobile device), a satellite transceiver, or the like. The I/O device(s) 85 may include, for example, a keyboard or keypad, a monitor, and a pointing device (e.g., a mouse, trackball, or touchpad). Note, however, that such I/O devices may be unnecessary for certain devices and/or in certain embodiments. For example, a proxy or origin server does not necessarily require local I/O devices, particular if the proxy or origin server is not intended to directly interface with a user or operator. Similarly, a mobile device may not require a mass storage device. Many other variations on the above described embodiment other possible.

Note that the flow control techniques described above may be implemented in software, which may be stored in RAM 83, mass storage device 84 and/or ROM 82.

Thus, a method and apparatus for using an intermediary node on a data communication network to control network congestion have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method comprising:
using an intermediary node on a network to forward messages on behalf of a plurality of other nodes on the network;
determining, in the intermediary node, that a first message received by the intermediary node from a first downstream node and destined for an upstream node should not be forwarded, based on congestion detected on the network;
using a flow control algorithm in the intermediary node to compute a back-off time period, wherein the back-off time period is a minimum amount of time for the first downstream node to wait before resending the message destined for the upstream node;
sending a first outgoing back-off message including the back-off time period from the intermediary node to the first downstream node in response to the first message and said determining that the first message should not be forwarded;
receiving, in the intermediary node, a second message destined for the upstream node, the second message from a second downstream node;
in response to receiving the second message, determining in the intermediary node whether the back-off time period in said first outgoing back-off message sent to the first downstream node has expired; and
if the back-off time period sent to the first downstream node has not expired, sending a second outgoing back-off message from the intermediary node to the second downstream node.

2. A method as recited in claim 1, further comprising using the intermediary node to detect the congestion on the network.

3. A method as recited in claim 2, wherein using the intermediary node to detect the congestion on the network comprises detecting congestion on the network based on an incoming back-off message received by the intermediary node from the upstream node on the network.

4. A method as recited in claim 3, wherein the back-off message received by the intermediary node specifies one or more back-off criteria.

5. A method as recited in claim 4, wherein the back-off criteria comprise metadata indicating applicability of the back-off message received by the intermediary node.

6. A method as recited in claim 2, wherein using the intermediary node to detect the congestion on the network comprises detecting congestion on the network based on a failure by the upstream node on the network to respond to a request forwarded by the intermediary node.

7. A method as recited in claim 1, wherein said determining comprises using a back-off strategy to determine when a request received by the intermediary node should not be forwarded, and wherein the method further comprises adapting the back-off strategy dynamically based on operation of the network.

8. A method of operating an intermediary network node, the method comprising:
using the intermediary network node to proxy requests and responses to requests between a plurality of clients and a plurality of servers, wherein at least one of the clients is a mobile client operating on a wireless network and at least one of the servers operates on a landline network, the intermediary network node coupled between the wireless network and the landline network;

using the intermediary network node to convert requests between a wireless protocol used by the wireless network and a second protocol used by the landline network;

using the intermediary network node to detect network congestion on at least the landline network;

determining, in the intermediary network node, that a first request received by the intermediary network node from one of the clients destined for one of the servers should not be forwarded by the intermediary network node, based on network congestion on the landline network detected by the intermediary network node;

using a flow control algorithm in the intermediary node to compute a back-off time period, wherein the back-off time period is a minimum amount of time for one of the clients to wait before resending the request destined for one of the servers;

sending a first outgoing back-off message including the back-off time period from the intermediary node to a first client in the plurality of clients in response to the first request and said determining that the first request should not be forwarded;

receiving, in the intermediary node, a second request destined for said one of the servers, the second request from the mobile client;

in response to receiving the second request, determining in the intermediary node whether the back-off time period in said first outgoing back-off message sent to the first client has expired; and if the back-off time period sent to the first client has not expired, sending a second outgoing back-off message from the intermediary node to the mobile client.

9. A method as recited in claim 8, wherein the landline network is the Internet.

10. A method as recited in claim 8, wherein said using the intermediary network node to detect the congestion on the network comprises receiving an incoming back-off message from an upstream node on the network.

11. A method as recited in claim 8, wherein said using the intermediary network node to detect the congestion on the network comprises detecting a failure by one of the servers to respond to a request forwarded by the intermediary network node.

12. A method as recited in claim 8, wherein said determining comprises using a back-off strategy to determine when a request received by the intermediary network node should not be forwarded, and wherein the method further comprises adapting the back-off strategy dynamically based on operation of the network.

13. A processing system for use as an intermediary node on a network, the processing system comprising:

means for forwarding messages on behalf of a plurality of other nodes on the network;

means for receiving from a first downstream node on the network a first message destined for an upstream node on the network;

means for detecting congestion on the network;

means for determining that the first message should not be forwarded, based on congestion on the network;

means for using a flow control algorithm in the intermediary node to compute a back-off time period, wherein the back-off time period is a minimum amount of time for the downstream node to wait before resending the message destined for the upstream node;

means for sending a first outgoing back-off message including the back-off time period from the intermediary node to the first downstream node in response to the first message and said determining that the first message should not be forwarded;

means for receiving, in the intermediary node, a second message destined for the upstream node, the second message from a second downstream node;

means for determining in the intermediary node, in response to receiving the second message, whether the back-off time period in said first outgoing back-off message sent to the first downstream node has expired; and means for sending, if the back-off time period sent to the first downstream node has not expired, a second outgoing back-off message from the intermediary node to the second downstream node.

14. A machine-readable program storage medium storing computer program code, the code for execution in an intermediary node on a network to cause the intermediary node to perform a process comprising:

communicating messages between a plurality of clients on the network and a plurality of servers on the network;

receiving from a client on the network a request destined for a server on the network;

detecting congestion on the network, and determining that the request received by the intermediary node from a first client on the network destined for a server on the network should not be forwarded by the intermediary node, based on congestion of the network;

using a flow control algorithm in the intermediary node to compute a back-off time period, wherein the back-off time period is a minimum amount of time the first client to wait before resending the request destined for the server;

sending a first outgoing back-off message including the back-off time period from the intermediary node to the first client in response to the request and said determining that the request should not be forwarded;

receiving, in the intermediary node, a second request destined for the server, the second request from a second client;

in response to receiving the second request, determining in the intermediary node whether the back-off time period in said first outgoing back-off message sent to the first client has expired; and if the back-off time period sent to the first client has not expired, sending a second outgoing back-off message from the intermediary node to the second client.

15. A processing system for use as an intermediary node on a network, the processing system comprising:

a processor;

a data communication device coupled to the processor to communicate data between the processing system and a plurality of other nodes on the network; and a storage facility coupled to the processor and storing instructions, for execution by the processor, which configure the processing system to execute a process to proxy requests and responses on behalf of the plurality of other nodes on the network, the process including:

forwarding requests from a plurality of clients on the network to a plurality of servers on the network;

forwarding responses received from the servers to the clients;

using the intermediary node to detect congestion on the network;

determining, in the intermediary node, when a first request received by the intermediary node from a first client on the network destined for a server on the network should not be forwarded by the intermediary node, based on congestion of the network;

using a flow control algorithm in the intermediary node to compute a back-off time period, wherein the back-off time period is a minimum amount of time for the client to wait before resending the request destined for the server;

sending a first outgoing back-off message including the back-off time period from the intermediary node to the first client in response to the first request and said determining that the first request should not be forwarded;

receiving, in the intermediary node, a second request destined for the server, the second request from a second client;

in response to receiving the second request, determining in the intermediary node whether the back-off time period in said first outgoing back-off message sent to the first client has expired; and if the back-off time period sent to the first client has not expired, sending a second outgoing back-off message from the intermediary node to the second client.

16. A processing system as recited in claim 15, wherein using the intermediary node to detect the congestion on the network comprises detecting congestion on the network based on an incoming back-off message received by the intermediary node from an upstream node on the network.

17. A processing system as recited in claim 16, wherein the back-off message received by the intermediary node specifies one or more back-off criteria.

18. A processing system as recited in claim 17, wherein the back-off criteria comprise metadata indicating applicability of the back-off message received by the intermediary node.

19. A processing system as recited in claim 15, wherein using the intermediary node to detect the congestion on the network comprises detecting congestion on the network based on a failure by an upstream node on the network to respond to a request forwarded by the intermediary node.

20. The method of claim 1, wherein the intermediary node comprises a telephony switch.

21. The method of claim 1, wherein the flow control algorithm is a function of at least one of: an incoming back-off message received from the upstream node or failure of the upstream node to respond to another message previously forwarded by the intermediary node to the upstream node.

22. The method of claim 1, wherein the back-off time period is included in a header of the outgoing back-off message.

23. The method of claim 22, wherein the header is a hypertext transport protocol (HTTP) header.

24. The method of claim 1, further comprising configuring the intermediary node to convert messages between a wireless access protocol (WAP) used on a wireless network and hypertext transport protocol (HTTP) used on a landline network, perform content caching and act as a firewall.

25. The method of claim 1, wherein traffic between at least one of the downstream nodes and the intermediary node is on a wireless network, the congestion detected is on a landline network, and sending at least one of the outgoing back-off messages reduces traffic in the wireless network.

* * * * *